(12) United States Patent
Kawamoto et al.

(10) Patent No.: US 7,211,910 B2
(45) Date of Patent: May 1, 2007

(54) STEP MOTOR

(75) Inventors: Hisashi Kawamoto, Chiba (JP); Seiichi Oishi, Chiba (JP)

(73) Assignee: Seiko Precision Inc., Chiba (JP)

( * ) Notice: Subject to any disclaimer, the term of this patent is extended or adjusted under 35 U.S.C. 154(b) by 0 days.

(21) Appl. No.: 11/388,871

(22) Filed: Mar. 24, 2006

(65) Prior Publication Data

US 2006/0163953 A1  Jul. 27, 2006

Related U.S. Application Data (63) Continuation of application No. 10/562,000, filed as application No. PCT/JP2004/009099 on Jun. 28, 2004.

(30) Foreign Application Priority Data

Jun. 30, 2003  (JP)  ............................. 2003-188981

(51) Int. Cl.
  *H02K 37/00*  (2006.01)
(52) U.S. Cl. .................................... 310/49 R; 310/216
(58) Field of Classification Search .............. 310/49 R, 310/112, 156.01, 216, 40 MM
  See application file for complete search history.

(56) References Cited

U.S. PATENT DOCUMENTS

| 4,144,467 A | * | 3/1979 | Nakajima et al. ......... 310/49 R |
| 4,361,790 A |   | 11/1982 | Laesser et al. |
| 4,371,821 A |   | 2/1983 | Laesser et al. |
| 4,565,955 A |   | 1/1986 | Kubota |
| 4,782,353 A | * | 11/1988 | Ogihara et al. ............. 396/463 |
| 5,959,378 A | * | 9/1999 | Stechmann ............... 310/49 R |

FOREIGN PATENT DOCUMENTS

| CH | 625646 | 7/1979 |
| JP | 59-80147 | 5/1984 |
| JP | 2001-33844 | 2/2001 |
| JP | 2001-61268 | 3/2001 |
| JP | 2003-21857 | 1/2003 |

OTHER PUBLICATIONS

International Search Report dated Sep. 28, 2004.
U.S. Appl. No. 11/386,419, Kawamoto et al., entire document.

* cited by examiner

*Primary Examiner*—Thanh Lam
(74) *Attorney, Agent, or Firm*—Michaud-Duffy Group LLP (57) ABSTRACT

A step motor includes a rotor having four magnetic poles, a first magnetic pole magnetically excited by a first coil, a second magnetic pole magnetically excited by a second coil, and a third magnetic pole magnetically excited by the first coil and the second coil. A gap D between the third magnetic pole and the rotor is larger than a gap d between the first magnetic pole and the rotor and the gap d between the second magnetic pole and the rotor, so that a magnetic attraction is generated between a pole of the rotor and the first magnetic pole and between another pole of the rotor and the second magnetic pole. With this step motor applied to a shutter driving mechanism of a camera, it is possible to surely retain the shutter state even when the current does not flow.

7 Claims, 10 Drawing Sheets

FULL OPEN

SMALL APERTURE

STEP MOTOR

CROSS-REFERENCE TO RELATED APPLICATIONS

This application is a continuation of and claims priority to U.S. patent application Ser. No. 10/562,000, filed Dec. 23, 2005, which claims priority to International Patent Application No. PCT/JP2004/009099, filed on Jun. 28, 2004, which claims priority to Japanese Patent Application No. 2003-188981, filed on Jun. 30, 2003, the subject matter of these patent documents is incorporated by reference herein in its entirety.

BACKGROUND OF THE INVENTION

1. Field of the Invention

This invention generally relates to small-sized step motors that are capable of generating enough detent torques, and more particularly, to a drive mechanism in a camera that employs the-aforementioned step motor.

2. Description of the Related Art

In recent years, cameras have become electronics devices and shutters thereof are driven by the step motors. In this type of cameras, it is desirable to include a mechanism in which the battery consumption can be suppressed and a shutter blade or diaphragm blade can be retained even when the current does not flow. Therefore, Japanese Patent Application Publication No. 2001-61268 (hereinafter, referred to as Patent Document 1), for example, proposes a step motor having a magnetic member that applies a lock force so that a rotor comes to a given position without swinging when the current does not flow through a coil. With such step motor, it is possible to stop the rotor at an accurate position at the time of stopping the motor and suppress the power consumption. In addition, Japanese Patent Application Publication No. 2003-21857 (hereinafter, referred to as Patent Document 2) discloses an invention relating to a shutter for a digital camera and proposes a shutter mechanism, thereby the shutter can be left open or closed even while the current is not flowing and the power consumption is suppressed.

The step motor disclosed in the afore-mentioned Patent Document 1 additionally includes the magnetic member to apply the lock force to the rotor. In addition, the motor used for the shutter disclosed in the afore-mentioned Patent Document 2 is formed in such a manner that magnetic poles of the stator facing an outer circumferential surface of the magnet are formed to have a complicated comb-like shape. Hence, the motors described in the above-mentioned conventional technique additionally include a member or needs a complicated processing, resulting in problems such as a complex motor structure and increased manufacturing costs.

SUMMARY OF THE INVENTION

The present invention has solved the above problems and has an object to provide a step motor by which a necessary detent torque is obtainable with a simple structure. The present invention intends to provide a drive mechanism of a camera having the afore-mentioned step motor.

According to another aspect of the present invention, there is provided a step motor including a rotor having four magnetic poles; a first magnetic pole magnetically excited by a first coil; a second magnetic pole magnetically excited by a second coil; and a third magnetic pole magnetically excited by the first coil and the second coil. A gap D between the third magnetic pole and the rotor is larger than a gap d between the first magnetic pole and the rotor and the gap d between the second magnetic pole and the rotor, so that a magnetic attraction is generated between a pole of the rotor and the first magnetic pole and between another pole of the rotor and the second magnetic pole.

According to the present invention, a strong magnetic attraction (magnetic coupling strength) is generated between the first magnetic pole and the rotor and between the second magnetic pole and the rotor, making it possible to obtaining a sufficient detent torque when the current does not flow through the coil. This detent torque has a large magnitude because of two sets of magnetic attraction between the two magnetic poles provided on the stator and those on the rotor. Accordingly, with the step motor applied to a shutter driving mechanism of a camera, it is possible to surely retain the shutter state even while no current is flowing. Such step motor having a simple structure is capable of surely suppressing the power consumption, enabling to be provided as a low-cost and energy-saving step motor.

According to another aspect of the present invention, preferably, there is provided a camera driving mechanism including the above-described step motor; an engagement pin that is connected to a rotor of the step motor and performs a turning motion within a given range; and an engagement hole that is engaged with the engagement pin and includes a sector that moves between a position to close an opening for image capturing and another position to open the opening for image capturing, in accordance with the turning motion of the engagement pin. This driving mechanism includes the step motor that can generate the above-described strong detent torque, enabling the sector to be retained in a desired state, even while the current is not flowing.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
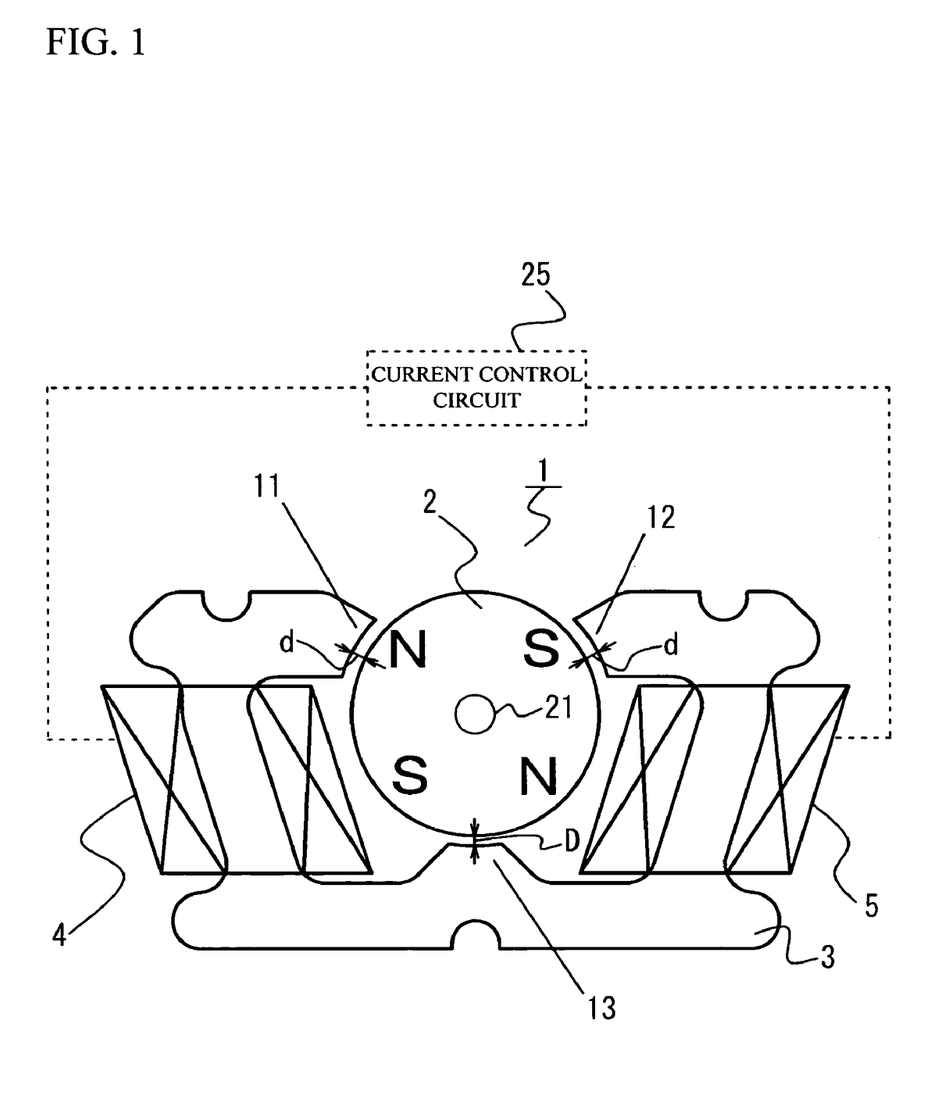
FIG. 1 is a view showing main components of a step motor in accordance with an embodiment.

A description will now be given, with reference to the accompanying drawings, of an embodiment of the present invention. FIG. 1 is a view showing main components of a step motor in accordance with an embodiment of the present invention. A step motor 1 includes a rotor 2 and a stator 3, the rotor 2 being arranged in the center thereof and capable of rotating in hot directions, the stator 3 being arranged to face an outer circumference of the rotor 2. The rotor 2 has a cross-section of circle and has a shape of cylinder. The stator 3 is integrally formed to have a cross section of substantially lateral U-shape, and is located in a state that the rotor 2 is housed in an internal space thereof. In addition, the step motor 1 is shown in FIG. 1 with an open end of the lateral U-shape facing upwardly.

The rotor 2 includes four magnetic poles, which are composed of two North magnetic poles and two South magnetic poles. The rotor 2 is a permanent magnet magnetized in positions where the poles having same polarity face each other, and is rotatably provided in both directions around an axis 21. Both ends of the stator 3 having the above-mentioned lateral U-shape are formed to face a circumferential surface of the rotor 2. The both ends are respectively a first magnetic pole 11 and a second magnetic pole 12. Also, a third magnetic pole 13 is arranged in an intermediate position of the first magnetic pole 11 and the second magnetic pole 12.

A first coil 4 is wound between the first magnetic pole 11 and the third magnetic pole 13, and a second coil 5 is wound between the second magnetic pole 12 and the third magnetic pole 13. The first magnetic pole 11 is magnetically excited when a current flows through the first coil 4, and the second magnetic pole 12 is magnetically excited when a current flows through the second coil 5. In contrast, the third magnetic pole 13 is magnetically excited by both the first coil 4 and the second coil 5. Accordingly, a magnetically excited state of the third magnetic pole 13 is shown as a combination of current-flowing states of the first coil 4 and the second coil 5.

FIG. 1 shows a current control circuit 25, which is indicated as a dotted line and connected to the first coil 4 and the second coil 5 of the step motor 1. In accordance with the present embodiment, the current control circuit 25 supplies the current to magnetically excite the first coil 4 and the second coil 5. Such supplied current includes two patterns that have been set. In a first pattern, the current is supplied from the current control circuit 25 to magnetically excite both the first coil 4 and the second coil 5, and a drive state of the rotor 2 is controlled by changing a current supply direction in each coil. In the first pattern, there are two state: one state is that the first magnetic pole 11 and the second magnetic pole 12 are magnetically excited to have a same magnetic polarity and the other state is that the first magnetic pole 11 and the second magnetic pole 12 are magnetically excited to respectively have different types of magnetic polarity. At this time, if the first magnetic pole 11 and the second magnetic pole 12 are magnetically excited to have the same magnetic polarity, which results in that the third magnetic pole 13 sets up a stronger magnetic field than those of the afore-mentioned magnetic poles. On the contrary, if the first magnetic pole 11 and the second magnetic pole 12 are magnetically excited to respectively have different types of magnetic polarity, magnetization in the third magnetic pole 13 is cancelled each other, resulting in a non-magnetization state.

In a second pattern, the current is supplied from the current control circuit 25 to magnetically excite either the first coil 4 or the second coil 5, and the drive state of the rotor 2 is controlled by changing the current supply direction. In the second pattern, only either the first magnetic pole 11 or the second magnetic pole 12 is magnetically excited, and it is changed to have an opposite magnetic polarity by changing the current supply direction. In the second pattern, the third magnetic pole 13 is magnetically excited to have an opposite polarity of those of the first magnetic pole 11 and the second magnetic pole 12 that has been magnetically excited.

In the first pattern, the drive of the rotor 2 is controlled by a two-phase magnetically excited state in which the first coil 4 and the second coil 5 are magnetically excited. On the other hand, in the second pattern, the drive of the rotor 2 is controlled by a one-phase magnetically excited state in which only either of the first coil 4 or the second coil 5 is magnetically excited. A description will be given later in detail, with reference to the drawings, of rotation states of the rotor 2 in the first pattern and in the second pattern.

By the way, the step motor 1 includes the rotor 2 having four magnetic poles, and is configured to obtain a sufficient detent torque with no currents flowing through the first coil 4 and the second coil 5. This point will be described. In the step motor 1, a gap d is configured to be a distance between the circumferential surface of the rotor 2 and the first magnetic pole 11, and the gap d is also configured to be a distance between the circumferential surface of the rotor 2 and the second magnetic pole 12. The gap d is configured to be narrow so that a sufficient magnetic attraction is obtainable with the magnetic poles on the rotor 2. In contrast, a gap D is a distance between the circumferential surface of the rotor 2 and the third magnetic pole 13, and is configured to be larger than the gap d. The gap D is configured to have a sufficient distance in such a manner that the magnetic attraction generated between the third magnetic pole 13 and the rotor 2 does not affect the magnetic attraction generated between the first magnetic pole 11 and the rotor 2 and that generated between the second magnetic pole 12 and the rotor 2. For example, the gap D is configured approximately 1.3 times as long as the gap d.

With the afore-mentioned configuration, it is realized that the first magnetic pole 11 and the second magnetic pole 12 respectively attract two magnetic poles on the rotor 2 intensely and the third magnetic pole 13 does not disturb this magnetic relationship. Therefore, while the current is not flowing, as exemplified in FIG. 1, the two magnetic poles on the rotor 2 become stable on positions accurately facing the first magnetic pole 11 and the second magnetic pole 12 respectively. In the step motor 1, there are two places (twp sets) that magnetically attract each other while there is no current, making it possible to obtain a strong detent torque. Accordingly, the step motor 1 is capable of stably retaining the rotor at a given position with no current flowing, and is suitable for use in, for example, a shutter driving mechanism of a camera to stably retain the shutter or the like in a desirable state.

Hereinafter, a description will be given of, with reference to FIG. 2A through FIG. 4E, the rotation of the rotor 2 in the step motor 1. FIGS. 2A through 2E show the above-described first current supply pattern, and the rotor 2 is rotated by the two-phase magnetically excited state that excites the first coil 4 and the second coil 5. FIG. 3A through FIG. 4E show the above-described second pattern, and the rotor 2 is rotated by a one-phase magnetically excited state that excites only either the first coil 4 or the second coil 5. In particular, FIG. 3A through FIG. 3E show a case where the first coil 4 is magnetically excited, and FIG. 4A through FIG. 4E show a case where the second coil 5 is magnetically excited. The current is supplied to the coils 4 and 5 shown in FIG. 2A through FIG. 4E by the current control circuit 25 shown in FIG. 1, yet it is not shown in these drawings. In addition, FIG. 3A through FIG. 4E show only coils through which the current is flown to facilitate the understanding.

Figure 2A:
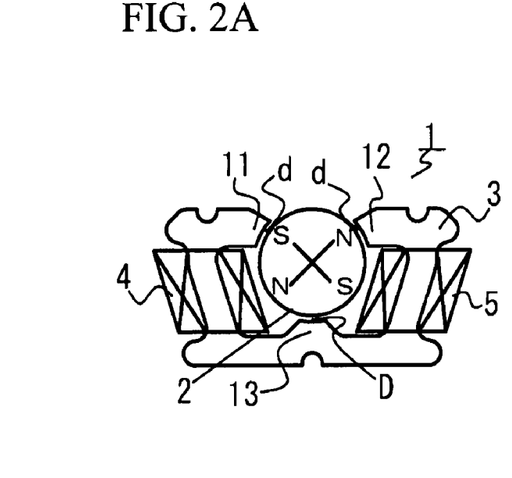
FIGS. 2A through 2E are views showing a case where a rotor of the step motor is rotated in a two-phase magnetically excited state in accordance with an embodiment.

Referring to FIG. 2A through FIG. 2E, a description will be given of how the rotor 2 of the step motor 1 rotates. FIG. 2A through FIG. 2E show the above-mentioned first pattern, and also shows a case where the first coil 4 and the second coil 5 are magnetically excited to rotate the rotor 2 in a clockwise direction (in a right-hand direction) at a step angle of 45°. In FIG. 2A, there is no current flowing through the coils 4 and 5. In FIG. 2B through FIG. 2E, the current is controlled to supply to the coils 4 and 5 and rotate the rotor 2 in a clockwise direction in a time-series manner. In FIG. 2A, the current does not flow through the coils 4 and 5, and the first magnetic pole 11 and the second magnetic pole 12 are not excited, yet South magnetic pole and North magnetic pole of the rotor 2 are respectively retained on the positions that face the first magnetic pole 11 and the second magnetic pole 12 with a strong detent torque, as described above.

Figure 2B:
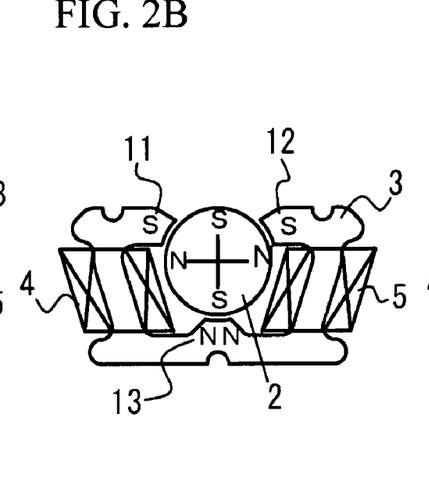

In FIG. 2B, the current flows through the first coil 4 and the second coil 5 from the state shown in FIG. 2A, and both the first magnetic pole 11 and the second magnetic pole 12 are magnetically excited to be South magnetic pole. At this time, the magnitude of North magnetic pole is doubled and excited in the third magnetic pole 13. Next, in FIG. 2C, the excitation state in the first magnetic pole 11 is retained in South magnetic pole from the state shown in FIG. 2B, and the second magnetic pole 12 is magnetically excited to be reversed to North magnetic pole. At this time, North magnetic pole and South magnetic pole are magnetically excited and cancelled each other, resulting in no magnetization in the third magnetic pole 13. In the same manner, in FIG. 2D, the first magnetic pole 11 and the second magnetic pole 12 are both magnetically excited to be North magnetic pole from the state shown in FIG. 2C. At this time, the magnitude of North magnetic pole is doubled and excited in the third magnetic pole 13. Next, in FIG. 2E, the excitation state in the first magnetic pole 11 is retained in North magnetic pole from the state shown in FIG. 2D, and the second magnetic pole 12 is magnetically excited to be opposite, namely, to be South magnetic pole. At this time, North magnetic pole and South magnetic pole are magnetically excited and cancelled each other, resulting in no magnetization in the third magnetic pole 13.

As described, the rotor 2 is rotated in a clockwise direction in steps of 45° as shown in the drawings, as the magnetization state gradually changes in the magnetic poles 11 through 13 in the stator 3. Here, the respective drawings of FIG. 2 show that the current flows through the first coil 4 and the second coil 5 and the rotor 2 is located in a position where a rotation of 45° is completed. In FIG. 2A through FIG. 2E, of particular note is FIG. 2A showing the state in which no current is flowing. In the step motor 1, the gaps d between the first magnetic pole 11 and the rotor 2 and between the second magnetic pole 12 and the rotor 2 are formed narrow, thereby generating strong magnetic attractions respectively between the first magnetic pole 11 and the rotor 2 and the second magnetic pole 12 and the rotor 2. Thus, the detent torque enables the state shown in FIG. 2A to be surely retained even while the current is not flowing.

Figure 2C:
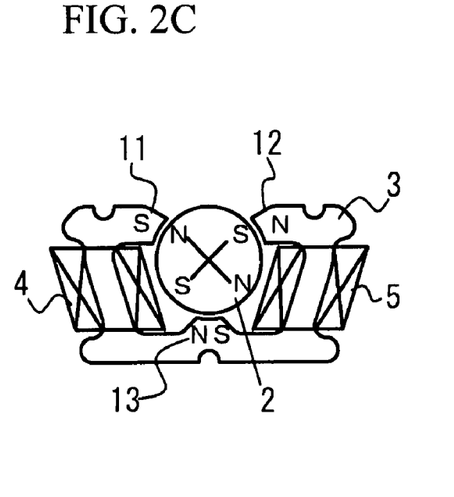
Figure 2D:
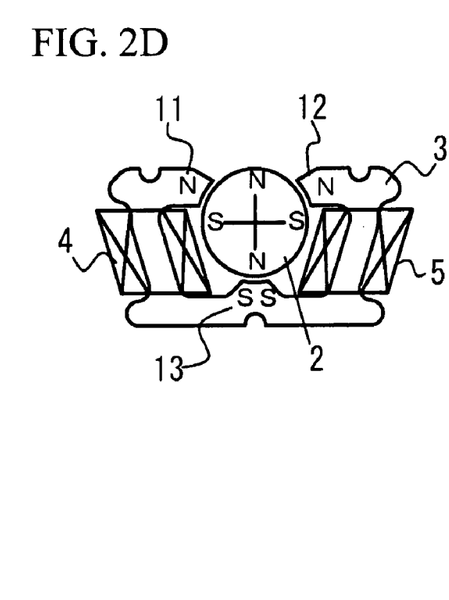
Figure 2E:
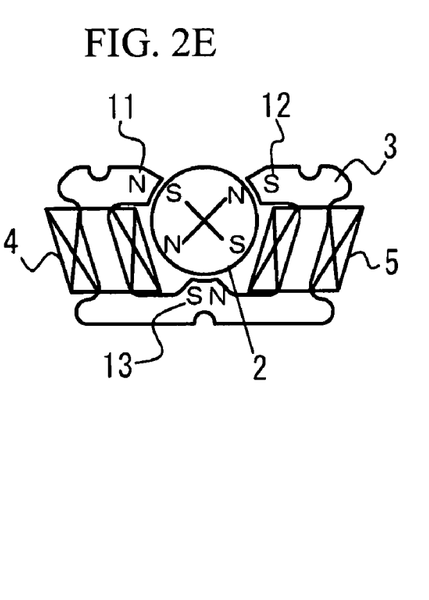

In addition, in the stats shown in FIG. 2C and FIG. 2E, the first magnetic pole 11 and the second magnetic pole 12 arc magnetically excited, yet the two magnetic fields on the rotor 2 accurately face the first magnetic pole 11 and the second magnetic pole 12 respectively. Even if the currents flowing through the coils 4 and 5 are blocked, the aforementioned states can be retained by the detent torque, same as the case shown in FIG. 2A. Here, the position of the rotor 2 is same as that shown in FIG. 2A. Accordingly, when the currents flowing through the coils 4 and 5 are blocked in the state shown in FIG. 2E, the state becomes that shown in FIG. 2A.

Figure 3A:
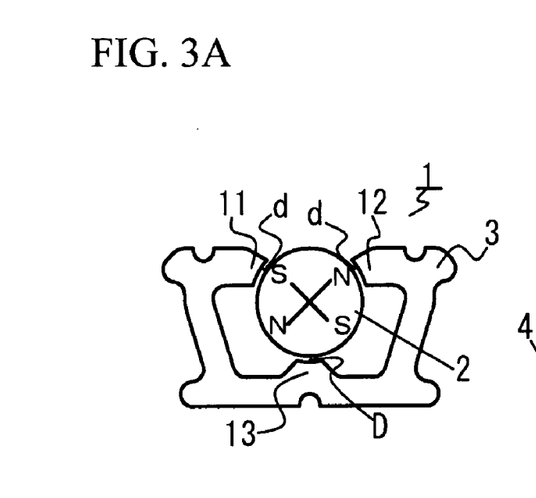
FIGS. 3A through 3E are views showing a case where a rotor of the step motor is rotated in a clockwise direction in a one-phase magnetically excited state in accordance with an embodiment.

FIG. 3A through FIG. 3E show the above-mentioned second current supply pattern, and also show a case where only the first coil 4 is magnetically excited in a one-phase magnetically excited state to rotate the rotor 2 in a clockwise direction (in a right-hand direction) at a step angle of 90°. In FIG. 3A, there are no currents flowing across the coils 4 and 5. In FIG. 3B through FIG. 3E, the current is controlled to supply to the coil 4 to rotate the rotor 2 in a clockwise direction in steps of 90° in a time-series manner. In FIG. 3A through FIG. 3E, a polarity of the first magnetic pole 11 is reversed by reversing the current direction supplied to the first coil 4. At this time, the polarity of the third magnetic pole 13 is an opposite one of the first magnetic pole. In addition, the second magnetic pole 12 is not magnetically excited from the coil, and has the same polarity as that of the third magnetic pole 13.

Figure 3B:
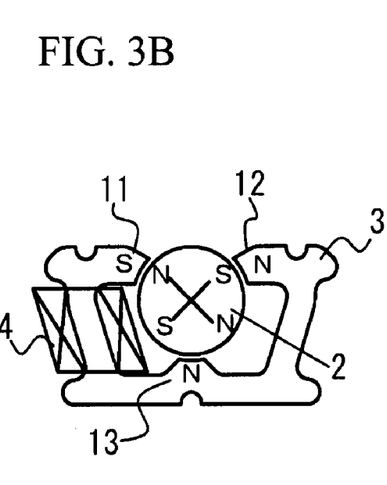
Figure 3C:
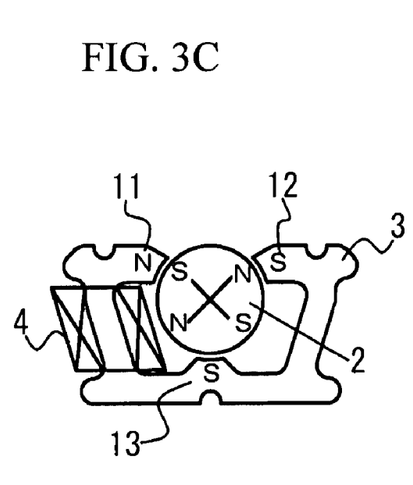
Figures 3D, 3E:
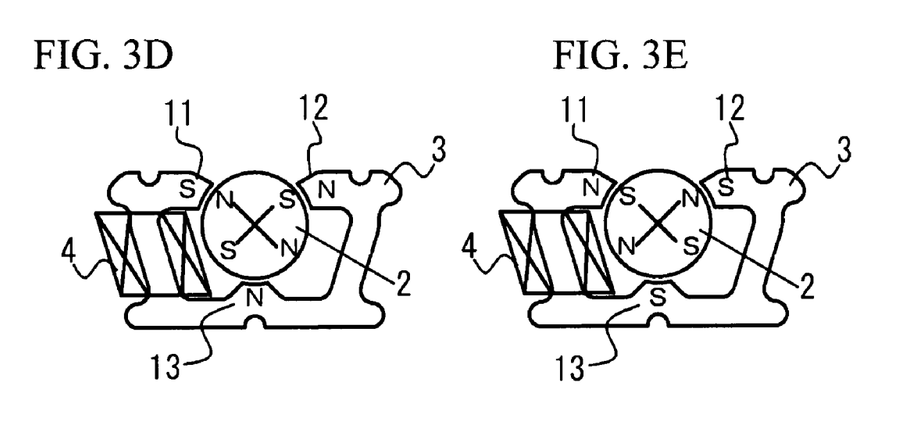
Figure 4A:
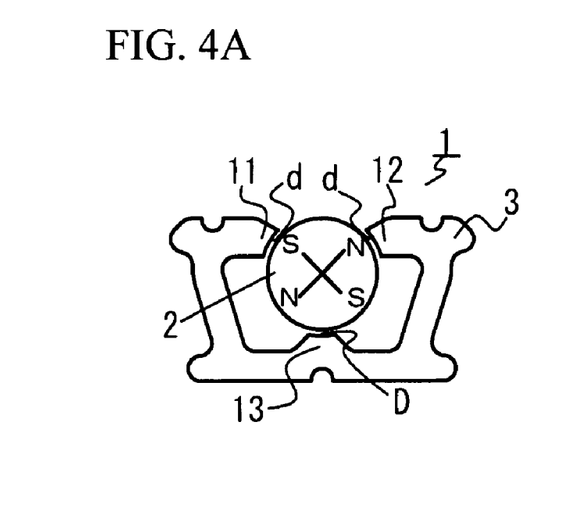
FIGS. 4A through 4E are views showing a case where a rotor of the step motor is rotated in a counterclockwise direction in a one-phase magnetically excited state in accordance with an embodiment.
Figure 4B:
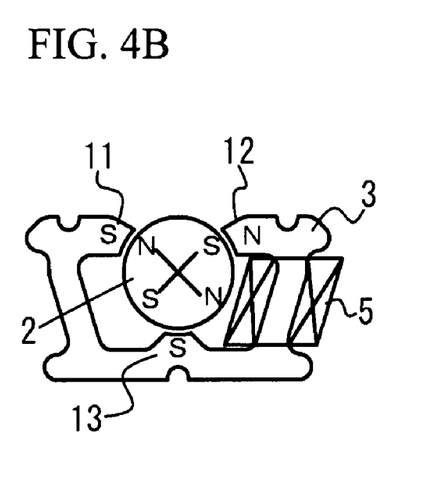
Figure 4C:
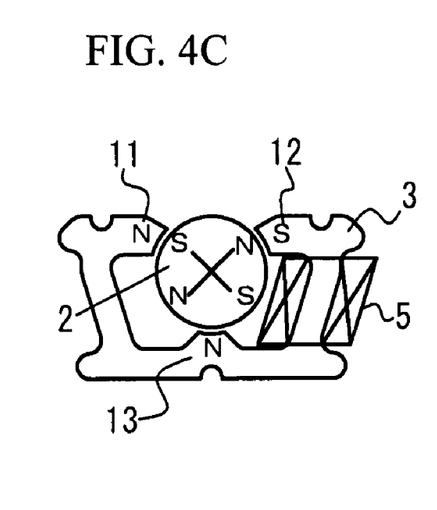
Figure 4D:
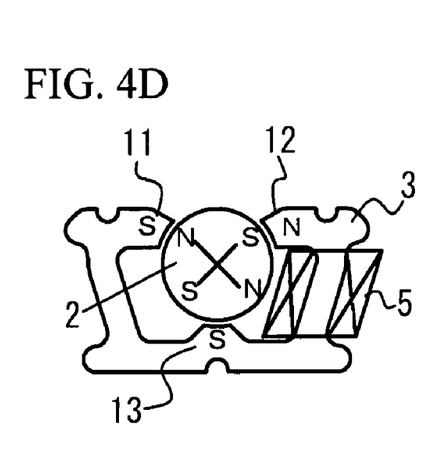
Figure 4E:
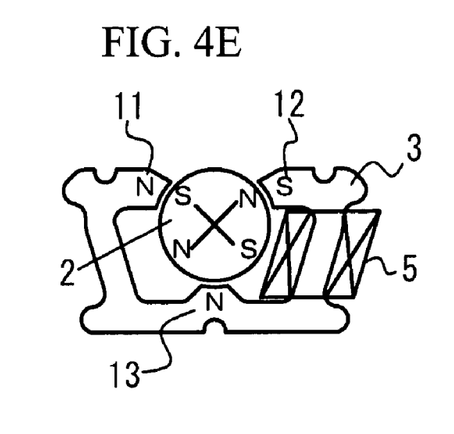

First, in FIG. 3A, the first magnetic pole 11 and the second magnetic pole 12 are not magnetically excited, and South magnetic pole and North magnetic pole of the rotor 2 are respectively arranged to face the first magnetic pole 11 and the second magnetic pole 12 by a strong detent torque, same as shown in FIG. 2A. In FIG. 3B, next, the current flows across the first coil 4 from the state of FIG. 3A, and the first magnetic pole 11 is magnetically excited to be South magnetic pole. At this time, the third magnetic pole 13 and the second magnetic pole 12 are magnetically excited to be North magnetic pole. In FIG. 3C, which is subsequently shown, the first magnetic pole 11 is changed to be North magnetic pole in the magnetically excited state from the state shown in FIG. 3B, and the third magnetic pole 13 and the second magnetic pole 12 are magnetically excited to be reversed to South magnetic poles. In the same manner, in FIG. 3D, the first magnetic pole 11 is magnetically excited to be South magnetic pole from the state shown in FIG. 3C. At this time, the third magnetic pole 13 and the second magnetic pole 12 are magnetically excited to be North magnetic poles. In FIG. 3E, next, the first magnetic pole 11 is changed to be North magnetic pole from the state shown in FIG. 3D, and the third magnetic pole 13 and the second magnetic pole 12 are magnetically excited to be opposite, namely, to be South magnetic pole.

As described above, the rotor 2 is rotated in a clockwise direction in steps of 90° as shown, as the magnetization states gradually change in the magnetic poles 11 through 13 in the stator 3. Here, the respective drawings of FIG. 3A through FIG. 3E show that the current flows through the first coil 4 and the rotor 2 is located in a position where the rotation of 90° is completed. In a one-phase magnetically excited state shown in FIG. 3A through FIG. 3E, two magnetic fields on the rotor 2 accurately face the first magnetic pole 11 and the second magnetic pole 12 respectively, in all states shown in FIG. 3A through FIG. 3E. Accordingly, even if the current flowing through the coil 4 is blocked in FIG. 3B through FIG. 3E, the aforementioned state can be retained by the detent torque, same as shown in FIG. 3A. Here, the example shown in FIG. 3A through FIG. 3E exhibits a remarkable advantage that the rotor 2 can be rotated in steps of 90° in a clockwise direction with the second coil 5 being in a halting state.

Further, FIG. 4A through FIG. 4E show the above-mentioned second current supply pattern, and also shows a case where only the second coil 5 is magnetically excited in a one-phase magnetically excited state to rotate the rotor 2 in a counterclockwise direction at a step angle of 90°. FIG. 4A through FIG. 4E show accurately reverse operations of those in FIG. 3A through FIG. 3E. Also in FIG. 4A through FIG. 4E, the rotor 2 is rotated in a counterclockwise direction in steps of 90° as shown in the drawings, as the magnetization conditions gradually change in the magnetic poles 11 through 13 in the stator 3. Additionally, also as shown in FIG. 4A through FIG. 4E, two magnetic fields on the rotor 2 accurately face the first magnetic pole 11 and the second magnetic pole 12 respectively, in all states shown in FIG. 4A through FIG. 4E. Accordingly, even if the current flowing through the coil 5 is blocked, the state can be retained by the detent torque.

As described above, the step motor 1 has a structure in which a strong detent torque is obtainable even while the currents are not flowing through the coils 4 and 5, on the basis of the configuration in which the strong magnetic attraction is generated respectively between the first magnetic pole 11 and the rotor 2 and between the second magnetic pole 12 and the rotor 2. Also as described heretofore, the detent torque is obtainable in the same manner in either case where the step angle is set to 45° in a two-phase magnetically excited state or where the step angle is set to 90° in a one-phase magnetically excited state.

FIG. 5A through FIG. 5E are views showing a stator having a preferable shape suitable for use in the step motor 1. In FIG. 5A through FIG. 5E, the same components and configurations as those of FIG. 1 through FIG. 2E have the same reference numerals. The first magnetic pole 11 and the second magnetic pole 12 of the stator 3 are configured to face the circumferential surface of the rotor, not shown, and to be formed into a shape having a vertically longer side to correspond to the longer side of the rotor. The stator 3 includes arms 31 and 32 on both sides, and the arms 31 and 32 are connected to a base 35. The third magnetic pole 13 is formed in the center of the base 35. The third magnetic pole 13 is also formed to have a shape having a vertically longer side, same as those of the first magnetic pole 11 and the second magnetic pole 12.

Figure 5:
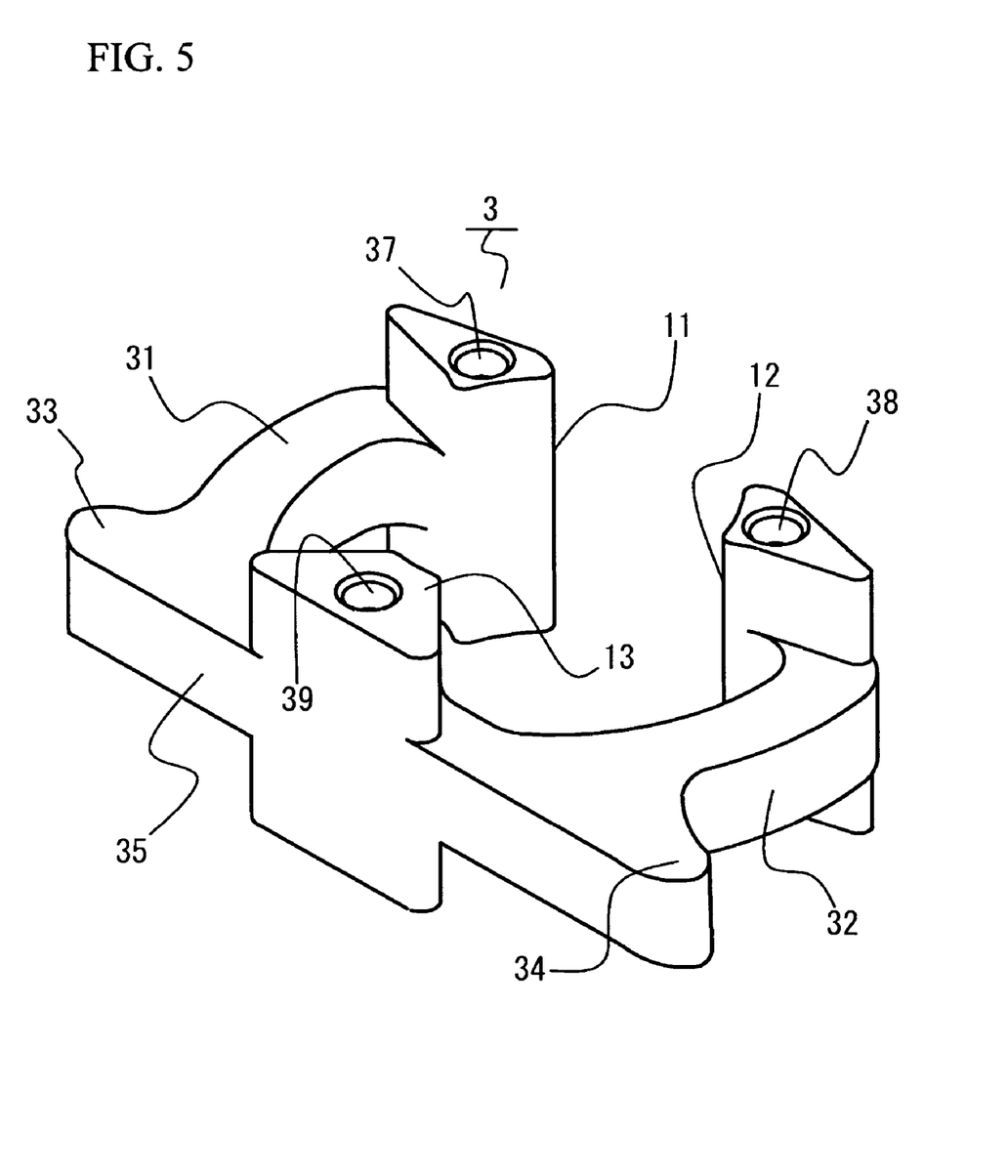
FIG. 5 is a view showing a stator having a preferred shape suitable for use in the step motor.

The stator 3 includes the arms 31 and 32, around which the coils 4 and 5 are wound for magnetically exciting the first through third magnetic poles. To position the coils 4 and 5, projections 33 and 34 are provided on back ends of the arms. Such provided projections 33 and 34 are capable of realizing the structure, in which the coils 4 and 5 respectively wound around the arms 31 and 32 can be surely positioned. In addition, indentations 37 through 39 are formed on tops of the magnetic poles 11 through 13. The step motor 1 in accordance with the present embodiment is incorporated into a module together with upper and lower cases. The indentations 37 through 39 are for use in positioning the case to be set.

Figure 6:
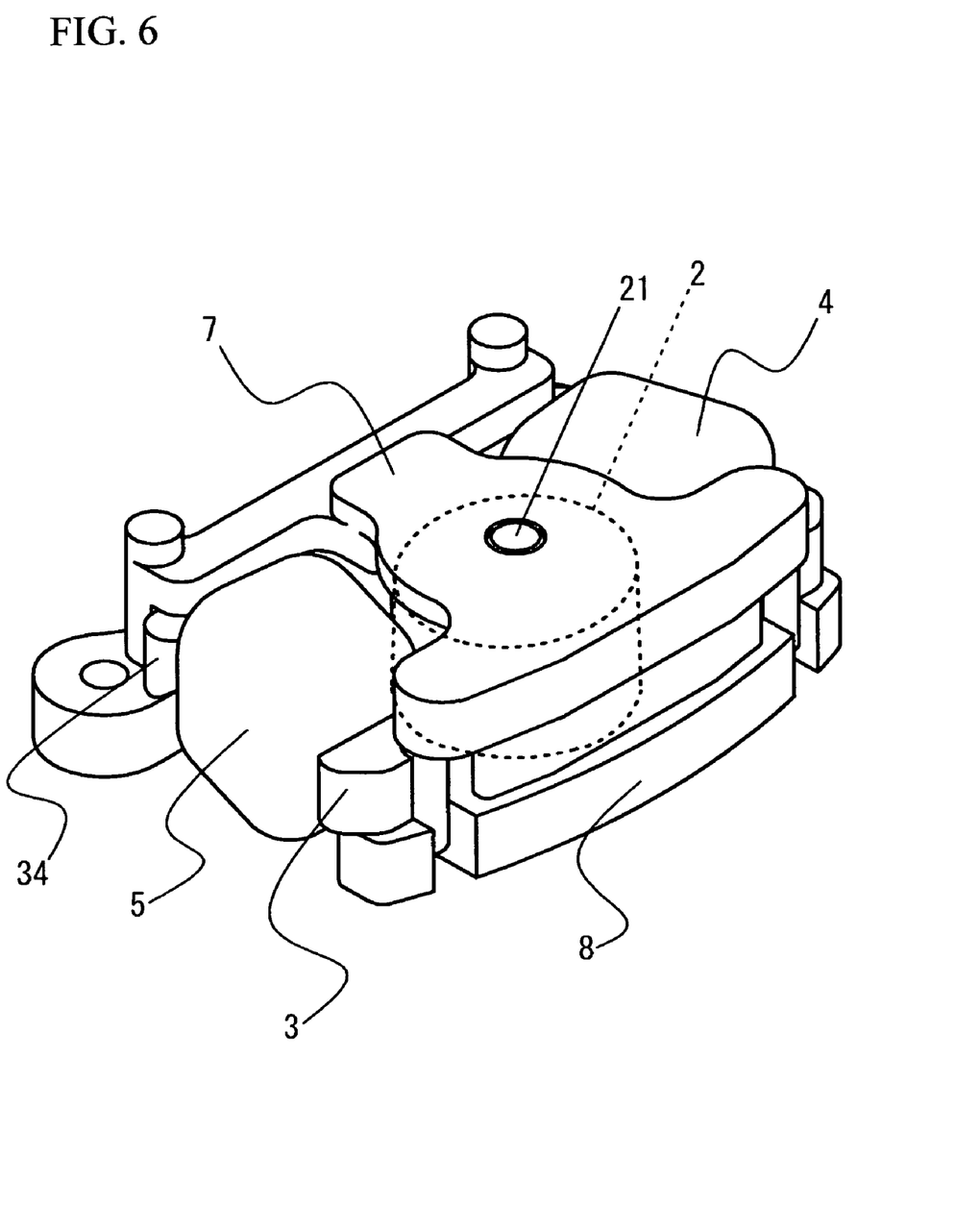
FIG. 6 is a perspective view showing an appearance of a module having a structure of the step motor.

FIG. 6 is a perspective view showing an appearance of the step motor 1, which is incorporated into a module with main components thereof. Also in FIG. 6, the same components and configurations as those of FIG. 1 through FIG. 2E have the same reference numerals. FIG. 6 shows a module in which an upper case 7 and a lower case 8 are set together with the main components from top and bottom. When such step motor module is employed for the shutter driving mechanism of a camera, a strong detent torque works while the current is not flowing. Thus, the shutter can be retained stably in a given state. This eliminates the necessity of the current flowing through the coil to retain the state of the shutter, making it possible to provide the step motor having the purpose of energy saving. In addition, the step motor has a simple structure in which the distances in arrangement between the rotor and the magnetic poles of the stator are changed, enabling the step motor to be realized at a low cost.

Figure 7A:
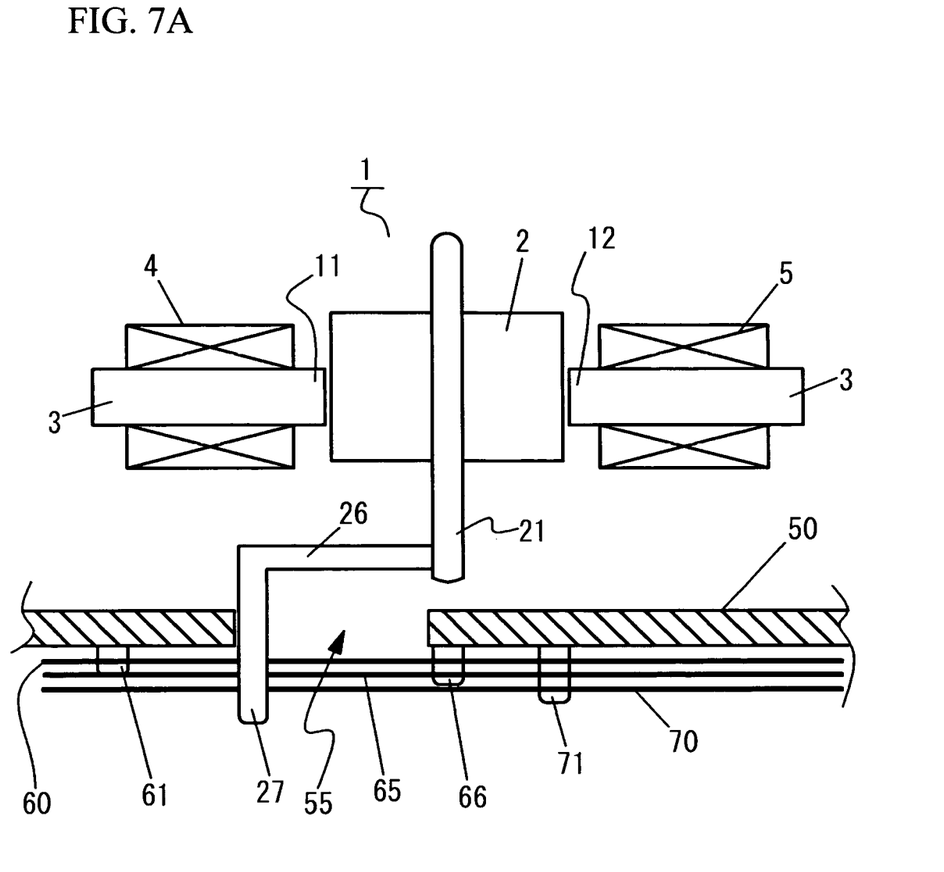
FIG. 7A is a view schematically showing a plan view of the step motor arranged in a shutter substrate.

Furthermore, a description will be given, with reference to FIG. 7A through FIG. 10, of an example of a driving mechanism in which the above-mentioned step motor 1 is employed for a shutter driving portion. FIG. 7A is a view schematically showing a plan view of the step motor 1 arranged in a shutter substrate 50. The shutter substrate 50 includes a lens opening 51 for image capture, as will be described below. Three sectors 60, 65, and 70 are arranged on the side of a front surface of the shutter substrate 50 along a face of the substrate 50. These sectors are, sequentially from the side of the shutter substrate 50, the first shutter blade 60, the second shutter blade 65, and the diaphragm blade 70. The step motor 1 is arranged on the side of a back surface of the shutter substrate 50.

Figure 8:
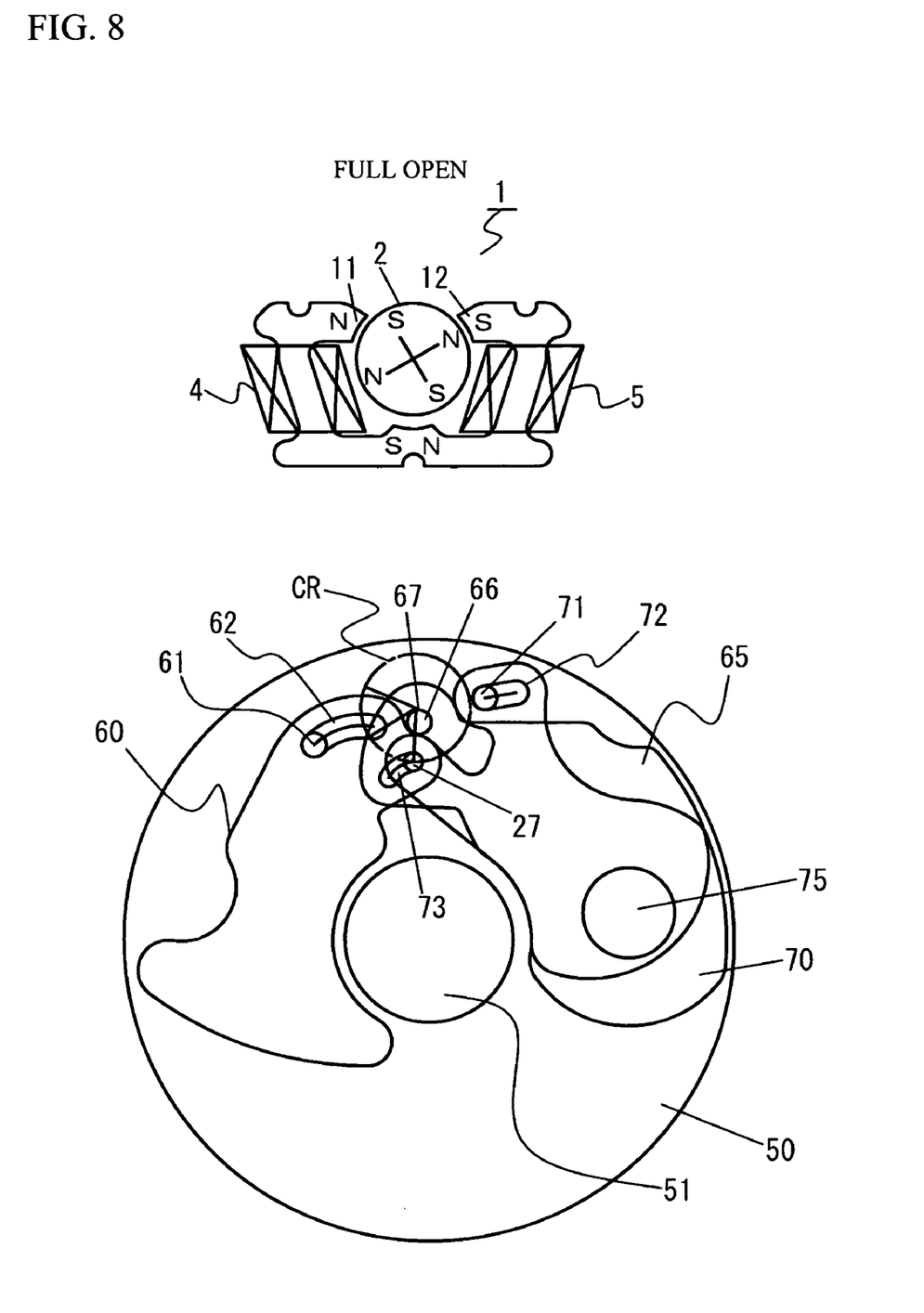
FIG. 8 shows a fully open state of a lens opening for image capturing provided in a the substrate.
Figure 9:
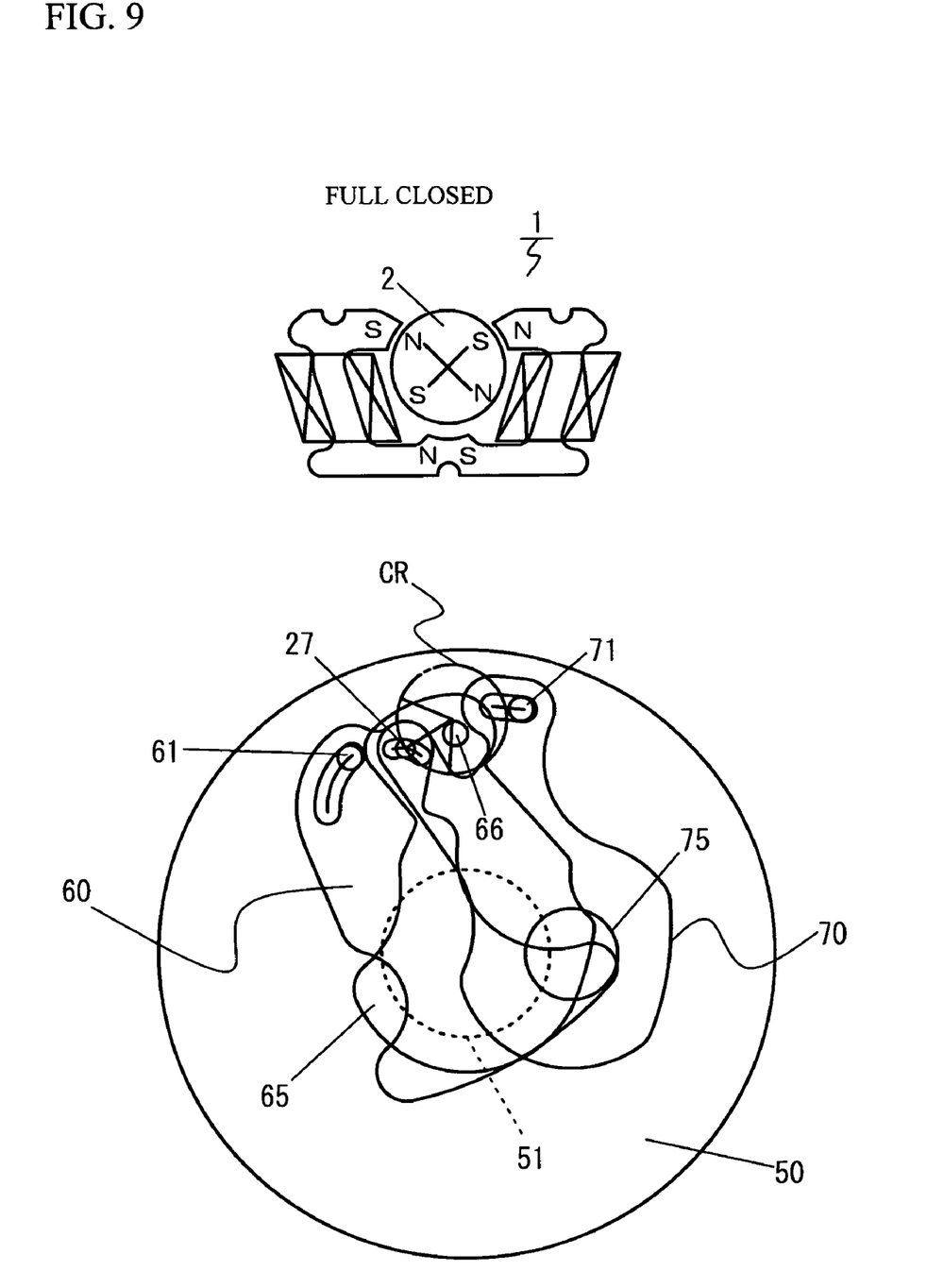
FIG. 9 shows a fully closed state of the lens opening for image capturing provided in the substrate.
Figure 10:
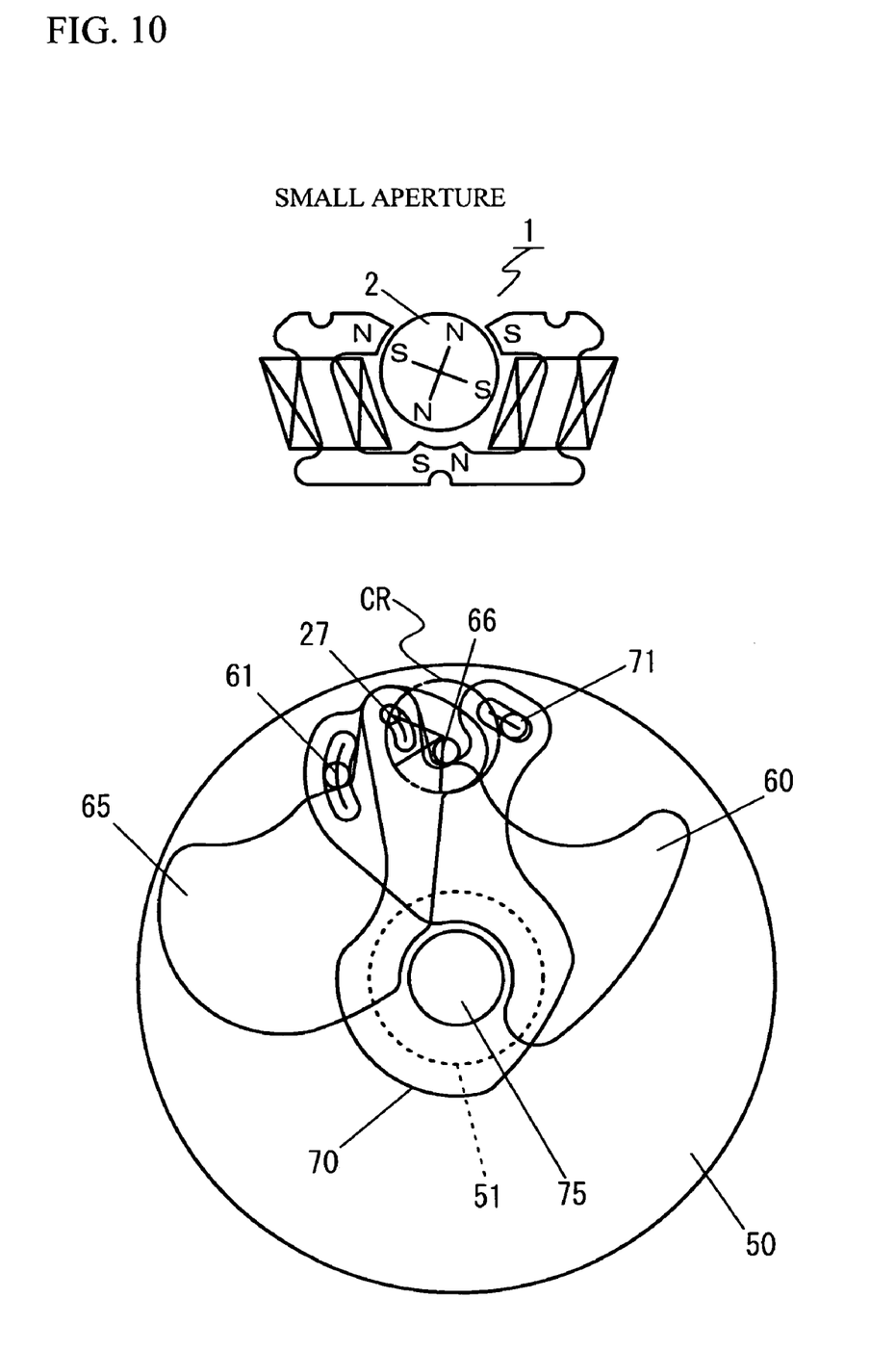
FIG. 10 is a view showing a state of small aperture of the lens opening for image capturing provided in the substrate.

In FIG. 7A, positions of holes cannot be confirmed, yet the fist shutter blade 60 has a hole engaged with a protrusion 61 provided on the substrate 50 and another hole engaged with an engagement pin 27 that extends from the rotor 2. In the same manner, the second shutter blade 65 has a hole engaged with a protrusion 66 provided on the substrate 50 and another hole engaged with the engagement pin 27 that extends from the rotor 2. In addition, the diaphragm blade 70 has a hole engaged with a protrusion 71 provided on the substrate 50 and another hole engaged with the engagement pin 27 that extends from the rotor 2. The afore-mentioned first shutter blade 60, the second shutter blade 65, and the diaphragm blade 70 swing while respectively drawing their own trajectories, according to a turning motion of the engagement pin 27, as will be described later. FIG. 8 through FIG. 10 will illustrate the positions of the holes provided on the blades 60, 65, and 70 and the motions thereof.

An arm 26, which radially extends, is connected to the rotor 2 arranged on the side of the back surface of the substrate 50 in the step motor 1. The engagement pin 27 is connected to an end of the arm 26, and extends to an opposite side through an opening 55 provided in the shutter substrate 50. The engagement pin 27 that protrudes on the side of the front surface is engaged with the holes respectively provided on the first shutter blade 60, the second shutter blade 65, and the diaphragm blade 70. Therefore, when the rotor 2 in the step motor 1 turns, the engagement pin 27 turns in conjunction with the motion thereof, and further, the first shutter blade 60, the second shutter blade 65, and the diaphragm blade 70 swing in given trajectories.

Figure 7B:
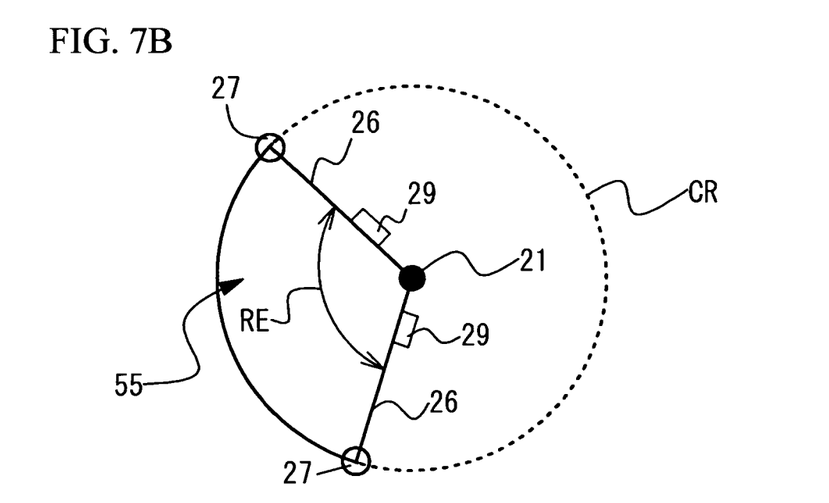
FIG. 7B is a view showing a motion trajectory an engagement pin.

FIG. 7B is a view showing a motion trajectory CR of the engagement pin 27. The engagement pin 27 is rotatable at 360° in accordance with the rotation of the rotor 2, whereas the opening 55 formed in the substrate 50 has a fan shape and members 29 are provided for regulating a movement of the arm 26. Therefore, in the present example, the engagement pin 27 is configured to turn within a given range RE. The range RE is set to have, for example, a center angle of approximately 120°.

A description will be given of, with reference to FIG. 8 through FIG. 10, of the shutter driving mechanism with the above-described configuration. Each of these drawings shows the first shutter blade 60, the second shutter blade 65, and the diaphragm blade 70 that change positions thereof, viewing from the side of the front surface of the shutter substrate 50. The step motor 1 is shown on upper sides of the drawings to confirm the rotating states of the rotor 2.

FIG. 8 shows a fully open state of the lens opening 51 for image capture, which is provided in the substrate 50. A code CR shown in FIG. 8 corresponds to that shown in FIG. 7B. At this time, the rotor 2 of the step motor 1 has a rotation angle of 0°, and is stopped in a position, for example, slightly closer to that shown in FIG. 2B than that shown in FIG 2A by regulation member 29. South magnetic pole and North magnetic pole of the rotor 2 are retained in the states in which they are moving to the positions that face the first and second magnetic poles 11 and 12 due to detent torque, yet are regulated by the regulation member 29. Hence, this shutter state is retainable even while the currents are not flowing through the coils 4 and 5 in the state shown in FIG 8. A state retaining force based on the detent torque is strong enough to surely retain the shutter state, even if a slight impact is applied onto the camera. Here, FIG. 8 shows a hole 62 engaged with the protrusion 61 provided on the first shutter blade 60, the hole 67 fit by the protrusion 66 provided on the second shutter blade 65. and the hole 72 engaged with the protrusion 71 provided on the diaphragm blade 70. As an engagement hole that is engaged with the engagement pin 27, an engagement hole 73 can be confirmed in the diaphragm blade 70 on a near side.

The rotor 2 of the step motor 1 shown on an upper side of FIG. 8 is slightly (approximately 25° in accordance with the present embodiment) shifted in a clockwise direction from the position of the rotor 2 in which no current flows, as shown in FIG. 2A. In the driving mechanism, positional relationships of the engagement pin 27 and the regulation members 29 (with reference to FIG. 7B) are configured so as to set up such shift in positions. With such configuration, the respective magnetic poles on the rotor 2 always intend to move to the positions that face the first and second magnetic poles 11 and 12, enabling the detent torque to be generated constantly. Accordingly, the respective blades 60, 65, and 70 can be retained stably in given positions by the detent torque.

FIG. 9 shows a fully closed state of the lens opening 51 for image capture, which is provided in the substrate 50. FIG. 9 shows a state in which the rotor 2 is rotated approximately 65° in a clockwise direction from the state shown in FIG. 8, and the engagement pin 27 rotates in conjunction therewith. The first shutter blade 60, the second shutter blade 65, and the diaphragm blade 70 swing while respectively drawing their own trajectories, according to the turning motion of the engagement pin 27. Then, the lens opening 51 is closed by the first shutter blade 60 and the second shutter blade 65. At this time, the rotor 2 of the step motor 1 rotates in a clockwise direction, and corresponds to the state of FIG. 2C, for example. In FIG. 9, North and South magnetic poles of the rotor 2 are respectively retained in the positions by the detent torque to accurately face the first and second magnetic poles 11 and 12 respectively. Hence, the shutter can be retained in this closed state, even if the currents flowing through the coils 4 and 5 are blocked in the state shown in FIG. 9. This state retaining force is strong enough to surely retain the shutter state, even if a slight impact is applied onto the camera.

FIG. 10 is a view showing a state of small aperture in which the diaphragm blade is positioned in the lens opening 51 for image capture, which is provided in the substrate 50. In FIG. 10, the rotor 2 further rotates in a clockwise direction from the state shown in FIG. 9, and the current has been flown twice as shown in FIG. 2E subsequent to FIG. 2D. The engagement pin 27 turns in conjunction therewith. The first shutter blade 60, the second shutter blade 65, and the diaphragm blade 70 swing while respectively drawing their own trajectories, according to the turning motion of the engagement pin 27. Then, the first shutter blade 60 and the second shutter blade 65 are moved away to positions that open the lens opening 51, and instead, the diaphragm blade 70 comes to a position to close the lens opening 51. The diaphragm blade 70 is equipped with a diaphragm opening 75, allowing the lens opening 51 to realize a state of small aperture. At this time, the rotor 2 of the step motor 1 rotates in a clockwise direction, and is stopped in a position, for example, slightly closer to that shown in FIG. 2D than that shown in FIG. 2E by the regulation member 29. In FIG. 10, the position of the rotor 2 with no current flowing is slightly shifted in a counterclockwise direction, same as shown in FIG. 8. The positions of the respective blades can be retained also in the state shown in FIG. 10, even if the currents flowing through the coils 4 and 5 are blocked, enabling the small aperture to be retained. The current may be flown once as shown in FIG. 2C, to return to the state shown in FIG. 9 from that shown in FIG. 10. The current may be flown once as shown in FIG. 2C, to move to the state shown in FIG. 9 from that shown in FIG. 8 or FIG. 10. However, the current may be flown twice as shown in FIG. 2A subsequent to FIG. 2B to move to the state shown in FIG. 8 from that shown in FIG. 9. The current may be flown twice as shown in FIG. 2E subsequent to FIG. 2D to move to the state shown in FIG. 10 from that shown in FIG. 9, as described above.

As described heretofore, the shutter driving mechanism that employs the above-mentioned step motor 1 is capable of retaining the fully open state, the fully closed state, and the small aperture state, as shown in FIG. 8 through FIG. 10, even when no current flows. This makes it possible to provide the mechanism in which energy saving is realized. The shutter driving mechanism as discussed heretofore has exemplified the step motor that drives two shutter blades and one diaphragm blade, yet is not limited to this embodiment and the number of the shutter blades and that of the diaphragm blades may be changed as necessary.

The afore-mentioned rotor may have a shape of cylinder; a stator having a plan view of substantially lateral U-shape is arranged to face a circumferential surface of the rotor; the first magnetic pole and the second magnetic pole are provided on both ends of the stator; and the third magnetic pole is provided in the center of the stator. In addition, preferably, in the afore-mentioned step motor, the first coil is provided between the first magnetic pole and the third magnetic pole and the second coil is provided between the second magnetic pole and the third magnetic pole; and the stator includes protrusions for preventing displacement of the first coil and the second coil. With such configuration, the first coil and the second coil can be surely positioned in given positions.

The sector may include a shutter blade and a diaphragm blade. By combining theses blades as necessary, a fully open state, fully closed state, and a state for small aperture can be set for the opening for image capturing provided on a shutter substrate. In addition, the shutter state can be retained while there is not current flowing.

According to the present invention, a strong magnetic attraction is generated between the first magnetic pole and the second magnetic pole on the stator and the rotor, making it possible to provide the step motor that can generate a sufficient detent torque on the rotor when there is not current flowing through the coil. Such step motor has a simple structure and can suppress the power consumption surely, and can be provided as a low-cost and energy-saving one.

The present invention is not limited to the above-mentioned embodiments, and other embodiments, variations and modifications may be made without departing from the scope of the present invention.

What is claimed is:

1. A step motor comprising:
a rotor having four magnetic poles; and
a stator having a substantially U-shaped structure, the stator including:
a first magnetic pole magnetically excited by a first coil;
a second magnetic pole magnetically excited by a second coil, the rotor being partially interposed between the first and second magnetic poles; and
a third magnetic pole magnetically excited by the first coil and the second coil;
wherein a gap D between the third magnetic pole and the rotor is larger than a gap d between the first magnetic pole and the rotor and the gap d between the second magnetic pole and the rotor, so that a magnetic attraction is generated between a pole of the rotor and the first magnetic pole and between another pole of the rotor and the second magnetic pole.

2. The step motor as claimed in claim 1, wherein:
the rotor has a shape of cylinder;
a stator having a plan view of substantially lateral U-shape is arranged to face a circumferential surface of the rotor;
the first magnetic pole and the second magnetic pole are provided on both ends of the stator; and
the third magnetic pole is provided in the center of the stator.

3. The step motor as claimed in claim 2, wherein:
the first coil is provided between the first magnetic pole and the third magnetic pole and the second coil is provided between the second magnetic pole and the third magnetic pole; and
the stator includes protrusions for preventing displacement of the first coil and the second coil.

4. A camera driving mechanism comprising:
a step motor;
an engagement pin that is connected to a rotor of the step motor and performs a turning motion within a given range; and
an engagement hole that is engaged with the engagement pin and includes a sector that moves between a position to close an opening for image capturing and another position to open the opening for image capturing, in accordance with the turning motion of the engagement pin,
the step motor includes:
a rotor having four magnetic poles; and
a stator having a substantially U-shaped structure, the stator including:
a first magnetic pole magnetically excited by a first coil;
a second magnetic pole magnetically excited by a second coil, the rotor being partially interposed between the first and second magnetic poles; and
a third magnetic pole magnetically excited by the first coil and the second coil;
wherein a gap D between the third magnetic pole and the rotor is larger than a gap d between the first magnetic pole and the rotor and the gap d between the second magnetic pole and the rotor, so that a magnetic attraction is generated between a pole of the rotor and the first magnetic pole and between another pole of the rotor and the second magnetic pole.

5. The camera driving mechanism as claimed in claim 4, wherein the sector includes a shutter blade and a diaphragm blade.

6. The step motor as claimed in claim 1, wherein the rotor can be stably retained wit poles of the rotor facing the first magnetic pole and the second magnetic pole when there is no current in the coils.

7. The camera driving mechanism as claimed in claim 4, wherein the rotor can be stably retained with poles of the rotor facing the first magnetic polo and the second magnetic pole when there is no current in the coils.

* * * * *

UNITED STATES PATENT AND TRADEMARK OFFICE
CERTIFICATE OF CORRECTION

PATENT NO.        : 7,211,910 B2
APPLICATION NO. : 11/388871
DATED             : May 1, 2007
INVENTOR(S)       : Hisashi Kawamoto and Seiichi Oishi It is certified that error appears in the above-identified patent and that said Letters Patent is hereby corrected as shown below:

Claim 7
Column 12, Line 38: After "first magnetic", please delete "polo" and substitute --pole--.

Signed and Sealed this

Twenty-sixth Day of June, 2007

JON W. DUDAS
*Director of the United States Patent and Trademark Office*